(No Model.)
J. J. THOMAS.
PIPE JOINT.
No. 364,686. Patented June 14, 1887.
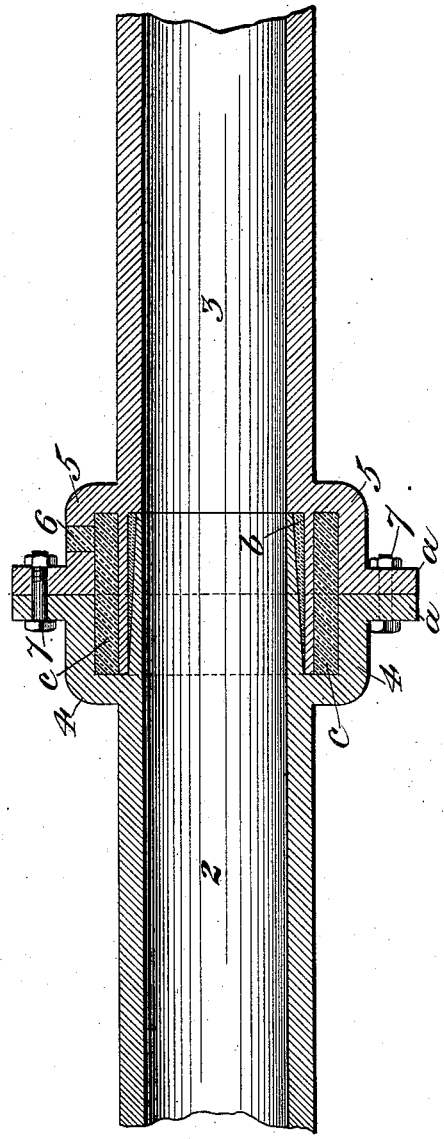
Witnesses
N. B. Corwin
H. L. Gill
Inventor
John J. Thomas
By his Attorneys
Bakewell & Kerr

UNITED STATES PATENT OFFICE.

JOHN J. THOMAS, OF PITTSBURG, PENNSYLVANIA.

PIPE-JOINT.

SPECIFICATION forming part of Letters Patent No. 364,686, dated June 14, 1887.

Application filed January 20, 1887. Serial No. 224,872. (No model.)

*To all whom it may concern:*

Be it known that I, JOHN J. THOMAS, of Pittsburg, in the county of Allegheny and State of Pennsylvania, have invented a new and useful Improvement in Pipe-Joints; and I do hereby declare the following to be a full, clear, and exact description thereof.

In the distribution of natural gas in pipes there is a great difficulty experienced in making the joints gas-tight. The unequal expansion and contraction of the pipes under the influence of changing temperature and the subtle nature of the gas often cause it to leak through openings which would be impervious to steam or ordinary manufactured gas.

My invention has for its object to prevent the danger of leakage by means of a simple and secure joint which is adapted to be tightly calked.

The accompanying drawing shows a longitudinal axial section of gas-pipes provided with my improved joint.

In the drawing, 2 and 3 are gas-pipes. Near their ends the pipes have integral annular bell-mouths 4 and 5, projecting from the sides of the pipes and extending toward the ends thereof. At the ends of the bell-mouths 4 and 5 they are provided with annular projecting flanges $a$. The ends of the pipes project beyond the bell-mouths 4 and 5, though from the bases of the bell-mouths the sides of the pipes are made thinner than the remainder thereof, so that the pipe 2 may fit within the end of the pipe 3, and the end of one of the pipes is preferably beveled, as shown in the drawing, so that there may be a tapering annular space, $b$, between the pipes when they are fitted together. The bell-mouth of one of the pipes is provided with a hole or gate, 6, through which calking material may be poured. Thus constructed, the ends of the pipes are fitted together, as shown in the drawing, the end of the pipe 2 fitting within the pipe 3, and the flanges $a\,a$ of the bell-mouths 4 and 5 abutting against each other, as shown. These flanges are held together by bolts and nuts 7. Lead, cement, or other calking material is then poured through the hole 6 into the space $c$ formed by the bell-mouths. Calking material is put in the beveled space $b$ when the pipes are being fitted together. The joint thus made is very secure. The presence of the flanges $a$, bearing against each other, braces the joint and prevents sagging of the pipe and straining of the coupling.

The pipes shown in the drawing are made of cast-iron, and the bell-mouths 4 and 5 are cast in the same pieces with them. They may, however, be made of wrought-iron, in which case the bell-mouths may be made separate and afterward shrunk on the pipes, the effect being to make the pipes and their bell-mouths integral in both cases.

I am aware that pipes having their ends fitting together and connected by bell-mouthed flanges abutting against each other and bolted are not new, and I do not claim the same, broadly. In such joints there is no calking-space between the pipes, such as my calking-space $b$, although they are provided with a calking-space between the bell-mouths. My invention differs from these prior devices in the use of the calking-space $b$, and the result incidental to its use is that the security of the joint is enhanced.

I claim—

As a pipe-coupling, the combination, with the pipes 2 and 3, one of which has a beveled end to afford a calking-space, $b$, when the pipes are fitted together, of bell-mouth pieces 4 and 5, made integral with the pipes, the ends of the pipes projecting beyond the bell-mouths and fitting within each other, and bolting flanges $a$ on the bell-mouths, the space between the bell-mouths and pipes being filled with calking material, substantially as and for the purposes described.

In testimony whereof I have hereunto set my hand this 18th day of January, A. D. 1887.

JOHN J. THOMAS.

Witnesses:
THOMAS W. BAKEWELL,
W. B. CORWIN.